(12) United States Patent
Xue et al.

(10) Patent No.: US 8,958,307 B2
(45) Date of Patent: Feb. 17, 2015

(54) ENABLING COEXISTENCE OF HIGH-DENSITY AND LOW-DENSITY TRANSMISSIONS

(75) Inventors: Feng Xue, Newbury Park, CA (US); Qinghua Li, San Ramon, CA (US); Wendy C. Wong, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 12/978,560

(22) Filed: Dec. 25, 2010

(65) Prior Publication Data
US 2012/0163181 A1    Jun. 28, 2012

(51) Int. Cl.
H04L 12/26    (2006.01)

(52) U.S. Cl.
USPC .......................................................... 370/241

(58) Field of Classification Search
USPC .......................................................... 370/241
See application file for complete search history.

(56) References Cited

U.S. PATENT DOCUMENTS

| 7,616,655 | B2 | 11/2009 | Benveniste | |
| 7,656,854 | B2 | 2/2010 | Benveniste | |
| 2007/0037600 | A1 | 2/2007 | Fukuda | |
| 2007/0280148 | A1* | 12/2007 | Ding et al. | 370/318 |
| 2011/0059762 | A1* | 3/2011 | Jones et al. | 455/522 |
| 2011/0205969 | A1* | 8/2011 | Ahmad et al. | 370/328 |

FOREIGN PATENT DOCUMENTS

| KR | 1020040031327 A | 4/2004 |
| KR | 1020080021764 A | 3/2008 |
| WO | 2012/088052 A1 | 6/2012 |

OTHER PUBLICATIONS

International Search Report & Written Opinion received for PCT Patent Application No. PCT/US2011/066058, mailed on Apr. 27, 2012, 9 pages.
International Preliminary Report On Patentability received for PCT Patent Application No. PCT/US2011/066058, mailed on Jul. 4, 2013, 6 pages.

* cited by examiner

*Primary Examiner* — Sulaiman Nooristany
(74) *Attorney, Agent, or Firm* — Schubert Law Group PLLC

(57) ABSTRACT

Embodiments may comprise logic such as hardware and/or code to enable coexistence of high-density and low-density transmissions with a modified CSMA protocol. Embodiments include a self-CTS (self clear to send) packet transmission prior to transmission of a ready to send (RTS) signal when initiating a high density transmission amidst legacy devices. In many embodiments, the self-CTS or the RTS includes a network allocation vector (NAV) having a value for the duration of the transmission. In some embodiments, the self-CTS may include a flag or bit to indicate the Shading Transmission Starts (STS).

17 Claims, 4 Drawing Sheets

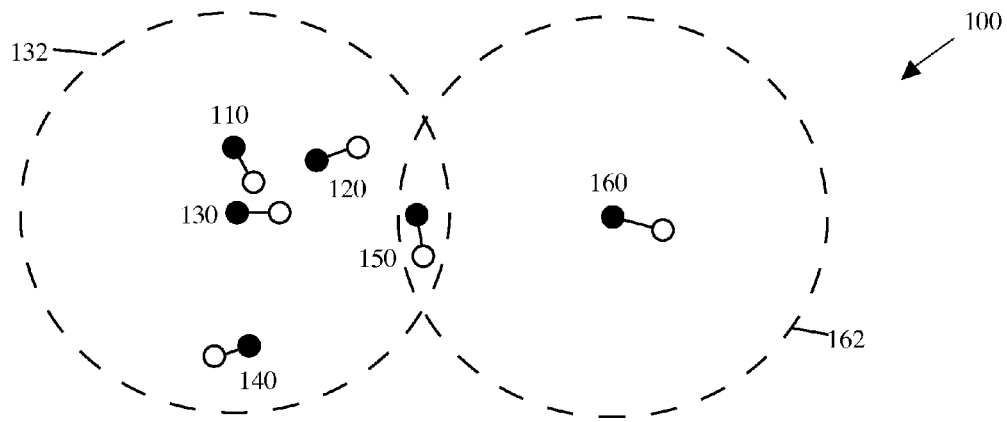
FIG. 1A
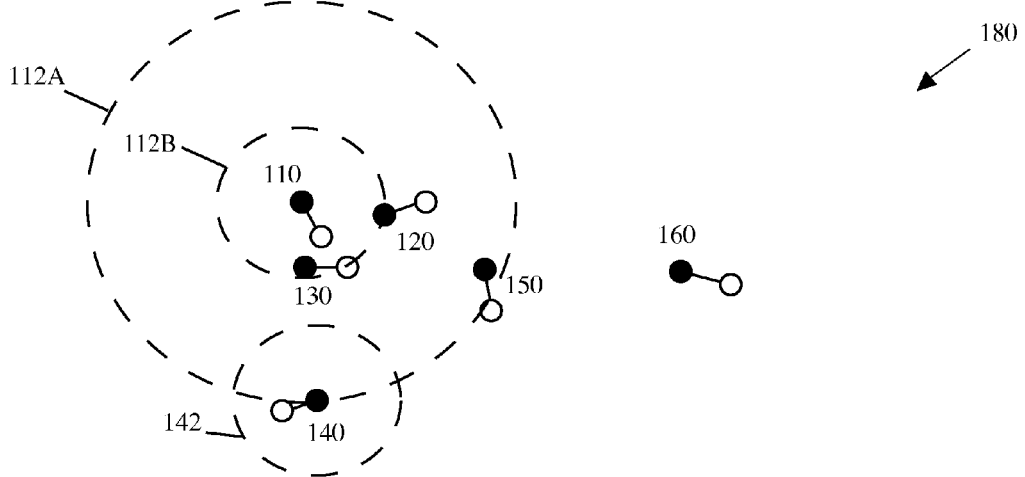
FIG. 1B
LEGEND
●     TRANSMITTER
○     RECEIVER
—     DIRECT PATH BETWEEN TRANSMITTER AND ITS RECEIVER
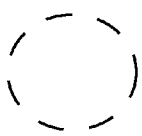 TRANSMISSION (MAGNITUDE IS PROPORTIONAL TO POWER OF TRANSMISSION)

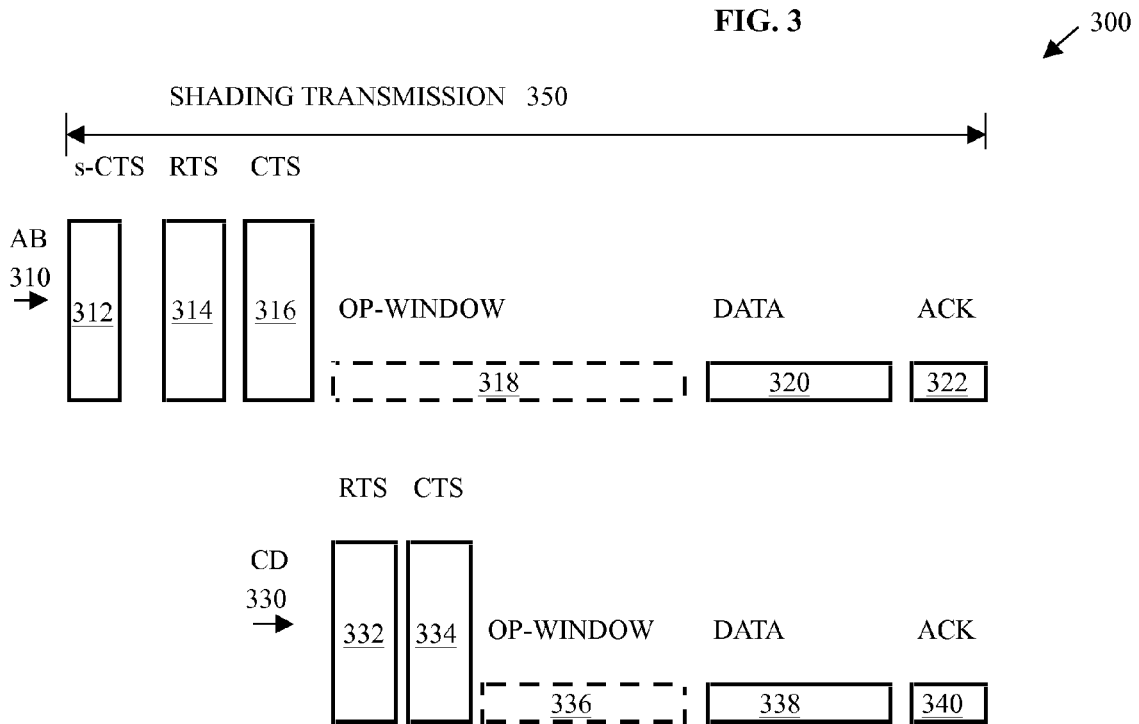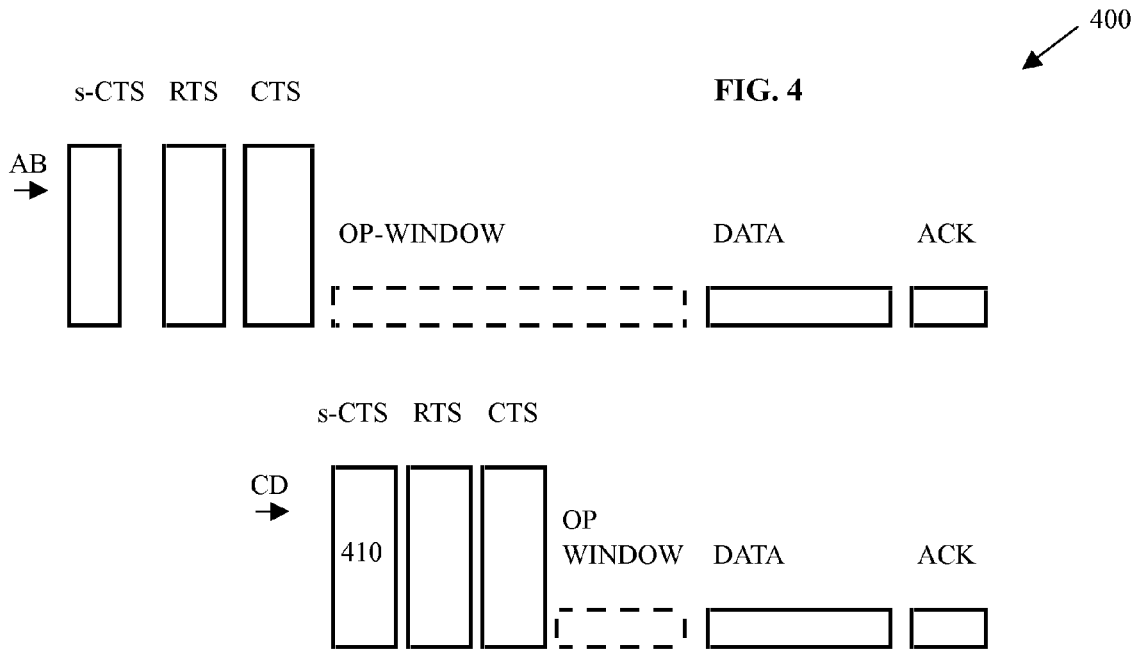

ENABLING COEXISTENCE OF HIGH-DENSITY AND LOW-DENSITY TRANSMISSIONS

BACKGROUND

The present disclosure relates generally to wireless communications technologies. More particularly, the present disclosure relates to enabling coexistence of high-density and low-density transmissions.

Wireless capability allows a variety of devices to communicate with each other adding to the mobility of users. A computing device, such as a Personal Computer (PC), may be used with various peripherals that are not wired together, but rather communicate using wireless communications, such as Wireless Local Area Network (WLAN) type protocols.

The density of the future distributed systems such as WiFi™ keeps growing. One very relevant example is that Intel is trying to ramp up density of wireless displays (WiDi). Wireless display (WiDi) is a technology in which image information, such as video information and audio information, on a computer display/screen is captured and encoded, and is then wirelessly transmitted to an adapter. For example, the video information and audio information may be wirelessly transmitted through WiFi™, which is a superset of the standards of IEEE 802.11 for a WLAN protocols. The video data is then decoded and displayed on another screen, such as a screen on a high definition television (HDTV) and the audio may be decoded and sounded through speakers for the HDTV. The quality of the video and audio expressed by the HDTV is dependent upon the throughput of the wireless channel for transmitting the encoded video and audio data. The throughput of the wireless channel is dependent upon channel conditions, such as the signal to noise ratio (SNR), which may detrimentally change to adversely affect video quality on the display screen and/or the audio quality sounded by the speakers.

It is well-known that using excessive power, e.g. 17 dBm (decibels relative to one milliwatt), is unnecessary and actually lowers system performance significantly due to interference with reception of parallel transmissions. For example, a 17 dBm plus 3 dBi (decibel isotropic) antenna has an interference radius of about 40 to 50 meters, while zero dBm is enough to provide 30 dB SNR at a distance of five meters. Shrinking from full power for transmissions to a power level that is necessary could achieve five times more transmissions.

Yet, not many devices are lowering power due to the fact that the act only benefits other devices and not necessarily the devices that actually lower the power for transmissions. Lowering the power for transmission may even interfere with ability of a receiving device to receive the transmission when there are legacy devices nearby. The receiving device may have difficulty receiving the lower power transmission because of the asymmetric interference footprint between the high power or excessive power transmissions from legacy devices and the low power transmissions. The low power link established for the low power transmissions may not be able reach the legacy devices but the high power transmissions from a high power link can reach the low power devices and destroy the well-known CSMA-based RTS/CTS/DATA/ACK handshake for preventing hidden nodes.

BRIEF DESCRIPTION OF THE DRAWINGS

FIG. 1 depicts an embodiment of a system to enable the coexistence of high-density and low density transmissions;

FIG. 3 depicts an embodiment of a timing and power diagram to enable the coexistence of high-density and low density transmissions;

FIG. 4 depicts an embodiment of a timing and power diagram to enable the coexistence of high-density and low density transmissions.

DETAILED DESCRIPTION OF EMBODIMENTS

Figure 2:
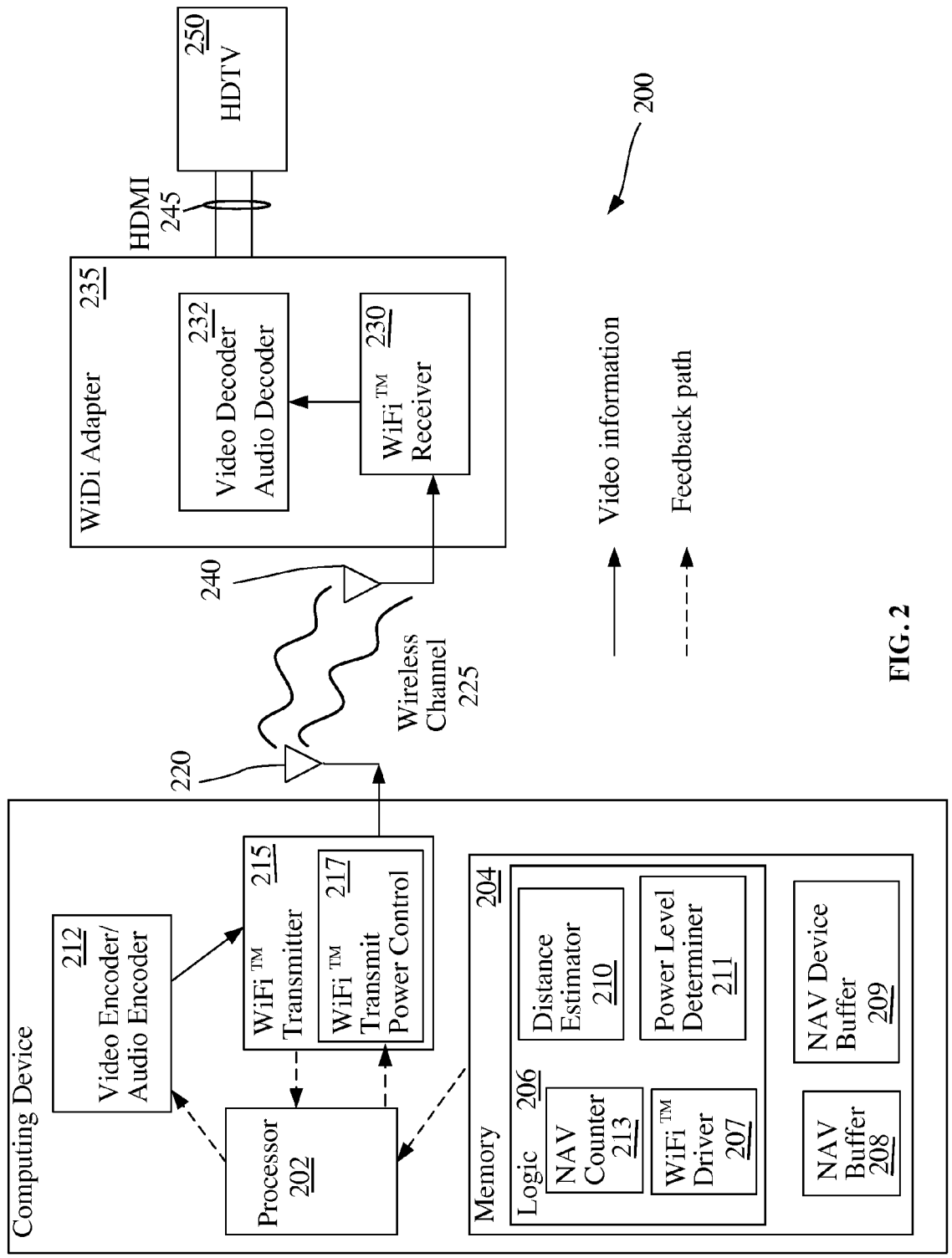
FIG. 2 depicts an embodiment of an apparatus to enable the coexistence of high-density and low density transmissions.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Wireless personal area network (WPAN) protocols and devices enable mobility and flexibility in computing systems, where devices and components may be implemented using wireless technology. For example, a personal computer (PC) may include a wireless processing unit, a wireless keyboard, a wireless mouse, and a wireless display. The PC then sends wireless signals to a display or other unit that contains a wireless adapter for receiving wireless signal, thus reducing the wired connections of a system. A system using, for example, WPAN 802.11 a/b/g/n protocol signaling, enables hundreds of Megabits of wireless communications over a local area network (LAN) using Orthogonal frequency-division multiplexing (OFDM) technology.

Wireless devices that use the 802.11b/g/n protocol may use the 2.4 Gigahertz (GHz) license free band and may occasionally suffer interference from other devices and appliances utilizing 2.4 GHz signals such as microwave ovens, cordless telephones and Bluetooth devices. Network resources may also be shared with other 802.11 b/g/n wireless devices and applications and may therefore cause co-channel and adjacent channel interference. The quality of the received wireless signal is strongly dependent on the channel condition, which is in turn dependent on the sharing of channel resources with other wireless devices and applications.

Carrier Sense Multiple Access (CSMA) is a probabilistic Media Access Control (MAC) protocol in which a node verifies the absence of other traffic before transmitting on a shared transmission medium, such as an electrical bus, or a band of the electromagnetic spectrum. "Carrier Sense" describes the fact that a transmitter uses feedback from a receiver that detects a carrier wave before trying to send. That is, it tries to detect the presence of an encoded signal from another station before attempting to transmit. If a carrier is sensed, the station waits for the transmission in progress to finish before initiating its own transmission. "Multiple Access" describes the fact that multiple stations send and receive on the medium. Transmissions by one node are generally received by all other stations using the medium.

CMSA is implemented by legacy devices. Embodiments generally build upon the CMSA protocol to maintain compatibility with the legacy devices while providing the low power devices a fair scheme for utilizing the medium to transmit data to receiving devices. For instance, embodiments may include wireless display (WiDi) devices wherein the transmitter is typically located near the receiver and can significantly reduce transmission power below the maximum rated power without sacrificing bandwidth.

Generally, wireless technologies for enabling the coexistence of high-density and low-density transmissions are described herein. Embodiments may comprise logic such as hardware and/or code to enable coexistence of high-density and low-density transmissions with a modified CSMA protocol. Embodiments include a self-CTS (self clear to send) packet transmission prior to transmission of a ready to send (RTS) signal when initiating a high density transmission amidst legacy devices. In many embodiments, the self-CTS or the RTS includes a network allocation vector (NAV) having a value for the duration of the transmission. NAV is a virtual carrier sensing mechanism used with wireless network protocols such as IEEE 802.11 and IEEE 802.16 (WiMax). The virtual carrier sensing is a logical abstraction that limits the need for physical carrier sensing at the air interface in order to save power. The MAC layer frame headers contain a Duration field that specifies the transmission time required for the frame, in which time the medium will be busy. The stations listening on the wireless medium read the Duration field and set their NAV, which is an indicator for a station on how long that station must defer from accessing the medium.

Handshake packets (self-CTS, CTS, and RTS) carry NAVs that hold the channel clear for the time stated in the NAV. A NAV covering up to the end of the ACK of the data packet are exchanged in the handshake packets. The acknowledgement (ACK) at the end of the transmission has a NAV of zero to signal the immediate end of the transmission. For instance, a WiDi transmitter may, in an effort to initiate a low power transmission, transmit a self-CTS with a NAV indicating a length of the transmission. The WiDi transmitter may thereafter transmit an RTS and the WiDi adapter that is the target of the transmission may transmit a CTS. The entire transmission from the transmission of the self-CTS through the end of the acknowledgement (ACK) package may be referred to as a "Shading Transmission" for the purposes of this disclosure. In some embodiments, the self-CTS may include a special address or flag bit to indicate that a "Shading Transmission Starts" (STS).

In several embodiments, the self-CTS and RTS issued by the WiDi transmitter and the CTS issued by the WiDi adapter may be transmitted at full power or a higher power than is determined to be necessary for the data transmission. The handshake packets (self-CTS, RTS, and CTS) may be followed by an opportunity window for other low power transmitters to join the data period to transmit data in parallel with the WiDi transmitter to execute the shading transmission. The opportunity window may comprise a fixed period of time in some embodiments, during which additional wireless devices may join the shading transmission to schedule data transmissions during the data period of the shading transmission. The fixed opportunity window may be part of the protocol or may be a default time frame. In other embodiments, the opportunity window may be established by the handshake packets. For instance, the modulation/coding schemes (MCSs) of the self-CTS/RTS/CTS can be used to specify the length of the opportunity window.

In many embodiments, additional transmitters may participate in the low power transmission by verifying the availability to join the transmission and transmitting an RTS. In particular, a second device may join the low power transmission if the second device is not being blocked by another, e.g., legacy or low power device and if the joining may not interfere with a previously established transmission. Such embodiments may determine whether the transmission power necessary for meeting a quality of service (QoS) will interfere with a previously scheduled transmission by a nearby device.

In further embodiments, devices that join a shading transmission may issue a self-CTS. In some of these embodiments, issuing a self-CTS by a transmitter that joins the shading transmission may facilitate the inclusion of additional devices that were outside the transmission range of the originating device. For example, device A may initiate a shading transmission. Device C may recognize the Shading Transmission Start (STS) transmitted by device A and transmit a self-CTS and an RTS. Device D may respond with a CTS. Device E may be outside the transmission range of device A but may be within the transmission range of device C and may recognize the shading transmission that device C joined based upon one or more of the handshake protocols between devices C and D. As a result, device E may also join the shading transmission. The shading transmission that device E perceives may have a shorter opportunity window. In some embodiments, device E identifies the shorter opportunity window based upon the remaining duration for the transmission indicated by a NAV from device C. In other embodiments, the shorter opportunity window may be otherwise communicated in the handshake packets.

In some embodiments, the opportunity window may have a fixed period of time after each self-CTS/RTS/CTS that is used to indicate the beginning of an opportunity window. The device that detects multiple self-CTS/RTS/CTS patterns may use the earliest detected pattern within a fixed trace back window counted from the latest detected pattern for determining the effective opportunity window. In the previous example, since device E is outside the range of device A, device E may not cause significant interference to the destination of device A. Therefore, the opportunity window of device E may not be shortened for device A. However, if device E is within the range of device A. Then device E detects the calls for opportunity windows from device A first and then device C. In this case, device E may to back trace the earlier self-CTS/RTS/CTS initiated by device A after it detects the self-CTS/RTS/CTS initiated by device C. The effective opportunity window is then set by the earliest call in the trace back window, which is the self-CTS/RTS/CTS initiated by device A. The trace back window may be on the order of 100 micro seconds.

The data portion of the shading transmission may be transmitted at a low power level. The low power level may be predetermined or may be determined based upon a QoS requirement for the data transmission as determined by each transmitter individually.

Embodiments may use the 802.11 wireless local area network (WLAN) protocol including 802.11 a/b/g/n and 802.11AC with OFDM technology at either a 2.4 GHz or 5 GHz band or 802.11AD at a 60 GHz band, or the 802.11AD wireless personal area network (WPAN) protocol including, for example, Ultra Wide Band (UWB) or Bluetooth® (BT), etc. as would be recognized by one skilled in the art.

While some of the specific embodiments described below will reference the embodiments with specific configurations, those of skill in the art will realize that embodiments of the present disclosure may advantageously be implemented with other configurations with similar issues or problems.

Turning now to FIG. 1A, there is shown an embodiment of a system at a first moment in time, system state 100. System state 100 illustrates interactions of transmissions from low power capable transmitters (110, 120, 140, and 150) and legacy transmitters (130 and 160) along with the receivers to which the transmitters are transmitting or intend to transmit data demarked by a line between the transmitter and receiver pairs. FIG. 1B shows the same system at a different moment in time, system state 180. The configuration and layout of the transmitters and receivers is chosen for illustration purposes. Embodiments encompass any configuration and layout of transmitters and receivers. In some embodiments, each self-CTS, RTS and CTS frames may comprise of one legacy 802.11a/b/g frame sent by one antenna or may comprise one legacy 802.11a/b/g frame sent by one antenna and/or one 802.11n frame sent by multiple antennas.

System state 100 in FIG. 1A illustrates an instance in time at which two legacy transmitters, 130 and 160, are transmitting data to their respective receivers. The volume of coverage for transmitter 130 by transmission 132 is illustrated as a two dimensional area in which the transmission 132 from transmitter 130 will interfere with reception by a receiver and the volume of coverage for transmitter 160 by transmission 162 is illustrated as a two dimensional area in which the transmission 162 from transmitter 160 will interfere with reception by a receiver. Note that the illustrated transmissions 132 and 162 theoretically form spherical patterns so the distances between the transmitters may reside along any axis. In other embodiments, transmitters may direct transmissions toward the intended receiver. Such embodiments have a volume of interference with a different pattern but, otherwise, the same interactions apply.

At system state 100, the transmission patterns from the legacy transmitters 130 and 160 prevent additional parallel transmissions amongst the other transmitters (110, 120, 140, and 150) due to interference with reception and WiFi™ protocols. For instance, transmitter 130 may transmit an RTS and may receive a CTS from the corresponding receiver. The RTS and CTS may include NAV durations to reserve the transmission medium for the duration of the transmission or the data period of the transmission may start after the CTS. The transmitters (110, 120, 140, and 150) may recognize that the medium is not idle by the NAV or the initiation of the transmission by the legacy transmitter 130. Based upon the power of the transmission of the RTS and/or CTS, the transmitters (110, 120, 140, and 150) may determine that the communication between transmitter 130 and its receiver will interfere with receipt of transmissions from transmitters (110, 120, 140, and 150) by their respective receivers. Thus, the initiation of the transmission by legacy transmitter 130 effectively blocks transmissions by transmitters (110, 120, 140, and 150).

The legacy transmitter 160 and its receiver are not within the interference area 132 so the legacy transmitter 160 may initiate a parallel transmission in the same manner as legacy transmitter 130. Note that in this situation, transmitter 150 and its receiver are blocked by the transmission initiated by transmitter 160 also.

At system state 180, there is shown the initiation of a low power, high density transmission. Transmission 112A illustrates the coverage of the transmission of a self-CTS packet and an RTS packet from transmitter 110. The transmission of the self-CTS packet indicates the beginning of a shading transmission. In some embodiments, the self-CTS packet may also include a flag or bit to indicate that the Shading Transmission Starts (STS). The receiver of transmitter 110 may then transmit a CTS, which is followed by an opportunity window for other transmitters to join. Transmitters (110, 120, 140, and 150) may recognize the initiation of a shading transmission based upon the transmission of the self-CTS, a combination of the self-CTS and RTS from transmitter 110, a combination of the self-CTS and RTS from transmitter 110 and the CTS from the receiver of transmitter 110, or the inclusion of the flag or bit indicative of the STS in the self-CTS.

One or more of the low power capable transmitters 130, 120, 140, and 150 may join the shading transmission if they are not otherwise blocked. In particular, transmitter 120 may receive the NAV and store the NAV from the self-CTS, RTS, and CTS. Transmitter 120 may receive the self-CTS, RTS, and CTS and determine that the receiver for transmitter 110 is sufficiently close to the transmitter 120 that a transmission from transmitter 120 would interfere with reception of the data transmission 112B from transmitter 110 to its receiver. Thus, transmitter 120 may determine that the transmission 112A of the self-CTS from transmitter 110 effectively blocks transmissions from transmitter 120 until the NAV expires.

Similarly, the legacy transmitter 130 may receive the self-CTS, RTS, and CTS and determine that the receiver for transmitter 110 is sufficiently close to the legacy transmitter 130 that a transmission 132 from transmitter 130 would interfere with reception of the data transmission 112B from transmitter 110 to its receiver. Thus, transmitter 130 may determine that the transmission 112B scheduled for the transmitter 110 effectively blocks transmissions from transmitter 130 until the NAV expires.

Transmitter 140 may receive the self-CTS, RTS, and CTS. In response, transmitter 140 may determine that the transmission power that transmitter 140 must emit to meet the QoS requirements for transmitting data to its receiver will be less than the transmission power estimated to interfere with the data transmission 112B from the transmitter 110 to its receiver during the data period of the shading transmission. In response, transmitter 140 may transmit a CTS and the receiver of transmitter 140 may respond with an RTS during the opportunity window of the shading transmission.

Transmitter 150 may receive the self-CTS, RTS, and CTS. If transmitter 150 receives a NAV from transmitter 160 after receiving the NAV from transmitter 110 and prior to having the opportunity to join the shading transmission, transmitter 150 would be blocked from joining the shading transmission. On the other hand, if transmitter 160 did not issue a NAV, transmitter 150 may determine that the transmission power that transmitter 150 must emit to meet the QoS requirements for transmitting data to its receiver will be less than the transmission power estimated to interfere with the data transmission 112B from the transmitter 110 to its receiver during the data period of the shading transmission. In response, transmitter 150 may transmit an RTS and the receiver of transmitter 150 may respond with a CTS during the opportunity window of the shading transmission. Furthermore, the CTS issued by the transmitter 150 may block transmitter 160 from transmitting over the medium until the NAV that transmitter 160 receives from transmitter 150 expires.

Turning now to FIG. 2, there is shown an embodiment of a system 200. The system 200 may, for example, include a computing device 205, which may include a processor 202 and a memory 204 as shown. In some embodiments, the processor 202 and the memory 204 may comprise hardware generally used by the computing device 205. In further embodiments, the processor 202 and the memory 204 may comprise hardware attached to an adapter card such as an adapter card for a transmitter. In some embodiments, the computing device 205 may include a desktop computer, personal computer, workstation, server, or a portable wireless communication device, such as a notebook, laptop, Netbook, smart phone, personal digital assistant (PDA), a web tablet, a wireless telephone, an instant messaging device, a digital camera, an access point, a television, a medical device (e.g., a heart rate monitor, a blood pressure monitor, etc.), or other device that may receive and/or transmit information wirelessly.

The computing device 205 may comprise a video encoder/audio encoder 212, and a WiFi™ transmitter 215. The video encoder/audio encoder 212 may encode video data and audio data for transmission across wireless channel 225 to WiDi adapter 235.

The WiFi™ transmitter 215 may transmit the compressed video and audio data from the video encoder/audio encoder 212 via an antenna 220 through an interface protocol by way of a wireless channel 225 and may send information such as video data, packet information, physical data rate, number of passing packets, number of failing packets, etc., to the processor 202. The interface protocol may include a local area network (LAN) 802.11 a/b/g/n, 802.11 AC and 802.11AD protocol, or a personal area network (PAN) protocol such as, for example, ultra wide band (UWB), Bluetooth® (BT), or the like. The WiFi receiver 230 of a WiDi (wireless display) adapter 235 may receive the compressed video and audio signal by way of an antenna 240. The WiFi™ receiver 230 may send the received compressed video and audio data to a video decoder/audio decoder 232 for video decompression and audio decompression, after which the decompressed video data and audio data may be sent to a display device such as HDTV 250 using an interface protocol such as High-Definition Multimedia Interface (HDMI) via an HDMI cable 245. Other embodiments may use other interface protocols such as a Mobile Industry Processor Interface (MIPI) Display Serial Interface (DSI), regardless of the content of the display data. Thus, both the computing device 205 and the WiDi adapter 235 may support wireless communications. Although not shown, embodiments also encompass integrating the WiDi adapter 235 into the TV to save an HDMI wired connection, or to have a wireless connection between the adapter and the TV.

In some embodiments, the WiFi™ transmitter 215 may be configured to transmit Orthogonal Frequency-Division Multiplex (OFDM) communication signals over a multicarrier communication channel. The OFDM signals may comprise a plurality of orthogonal subcarriers. In some of these multi-carrier embodiments, the WiFi™ transmitter 215 may be part of a Wireless Local Area Networks (WLANs) communication station such as a Wireless Access Point (WAP), base station or a mobile device including a Wireless-Fidelity (Wi-Fi) device. In some other embodiments, the WiFi™ transmitter 215 may be configured to transmit signals that were transmitted using one or more other modulation techniques such as spread spectrum modulation (e.g., Direct Sequence Code Division-Multiple Access (DS-CDMA) and/or Frequency Hopping Code Division-Multiple Access (FH-CDMA)), Time Division-Multiplexing (TDM) modulation, and/or Frequency Division-Multiplexing (FDM) modulation, although the scope of the embodiments is not limited in this respect.

The WiFi™ transmitter 215 may comprise a WiFi™ transmit control 217 to facilitate adjustment of the power level of a transmission. For instance, in the present embodiment, the WiFi™ transmitter 215 may transmit handshake packets such as self-CTS and RTS at a first power level such as full power for the transmitter (e.g. 17 dB). The WiFi™ transmitter 215 may, via WiFi™ transmit control 217, be capable of transmitting packets at other power levels such as transmitting a data transmission at a minimum power level to provide QoS (e.g. 0 dBm) for the WiDi adapter 235.

Antennas 220 and 240 may comprise one or more directional or omni-directional antennas, including, for example, dipole antennas, monopole antennas, patch antennas, loop antennas, micro-strip antennas or other types of antennas suitable for transmission of RF signals.

As further seen in FIG. 2, the memory 204 may store logic 206 and buffers such as a NAV buffer 208 and a NAV Device buffer 209. The logic 206 may comprise processing instructions in the form of a WiFi™ driver 207, a distance estimator 210, and a power level determiner 211. In other embodiments, one or more or all of these items in logic 206 and the buffers of memory 204 may be incorporated into hardware such as a special purpose processor, a state machine, or the like. In further embodiments, the logic 206 may reside on a transmitter adapter card in the form of code and/or hardware.

The WiFi™ driver 207 may be configured to direct the processor 202 to determine the transmission power level (p1) to support the quality of service (QoS) for the WiFi™ receiver 230 of the WiDi adapter 235. In some embodiments, the WiFi™ driver 207 may determine a current data transmission rate capacity of the wireless channel 225 to determine the transmission power level (p1).

The NAV buffer 208 may store one or more NAV values and the NAV device buffer 209 may store an indication of the transmitter responsible for the one or more NAV values. For example, the WiFi™ driver 207 may determine whether the NAV value is from a NAV device that blocks the WiFi™ transmitter 215 from initiating or joining a shading transmission. In particular, the WiFi™ driver 207 may determine if a NAV value is associated with another low power capable device. If so, the WiFi™ transmitter 215 may be able to join the shading transmission so that the WiFi™ transmitter 215 can transmit data to the WiFi™ receiver 230 during the data period of the shading transmission and in parallel with other data transmissions.

In some embodiments, two NAV counter(s) 213 may be employed, one for low power capable devices and the other for low power incapable devices. If the NAV counter 213 of low power incapable device decreases to zero, then the device is not blocked by legacy devices incapable of low power transmission and may be able to join or initiate a shading transmission. If both the NAV counter(s) 213 of the low power capable and the low power incapable decrease to zeros, then the device can initiate a shading transmission. If the NAV counter 213 of the low power incapable is zero but the NAV counter 213 of the low power capable is not zero, then the device may determine the effective opportunity window for joining the shading transmission initiated by another device low power capable. If there is still time left in the effective opportunity window, the device may estimate the interference level at each already scheduled receivers known by the device for determining if it should contend for a low power transmission in the remaining window. For determining the effective opportunity window, a buffer of NAV and their associated starting time may be needed and may be implemented in NAV buffer 208. The NAV buffer 208 may contain NAVs and their starting time within a predetermined trace back window. The low power capable NAV may be detected from the pattern of self-CTS/RTS/CTS or some flag bit in the self-CTS/RTS/CTS handshake exchange.

The WiFi™ driver 207 may also determine if the NAV value is associated with a NAV device that is not capable of a low power transmission such as a legacy device. If so, the WiFi™ transmitter 215 may not join the transmission and may be blocked from initiating another transmission on the medium until the transmission terminates.

The distance estimator 210 may estimate a distance from a transmitter and a distance from a receiver based upon handshake packets received from the transmitter and receiver. Based upon these distances, power level determiner 211 may determine a power level (p2) at which a data transmission from the WiFi™ transmitter 215 may interfere with reception of a data transmission by the receiver. For example, a first transmitter may establish a shading transmission to transmit data to a first receiver. The WiFi™ transmitter 215 may first check to see if another transmission blocks the WiFi™ transmitter 215 from joining the shading transmission. If the WiFi™ transmitter 215 is not blocked from joining the shading transmission, the WiFi™ transmitter 215 determines two power levels: the power level p1 to support QoS to WiFi™ receiver 230 and the power level p2 that is a power level sufficiently low to avoid interfering with reception of a data transmission by the first receiver from the first transmitter. This power level may be predetermined based upon the distance from the first receiver to the WiFi™ transmitter 215. In some embodiments, this power level may be estimated based upon the power drop of the CTS packet received from the first receiver. For example, −80 dBm may be assumed to be a power level at which the transmission does not interfere with reception of another transmission.

In many embodiments, a distance between the first receiver and the first transmitter may be assumed in the estimation of the power sufficient to interfere with the reception. If the power level p2 is greater than the power level p1, the WiFi™ transmitter 215 will use the power level p1 to transmit during the data period of the shading transmission. On the other hand, if the power level p2 is less than the power level p1, the WiFi™ transmitter 215 will be effectively blocked from transmitting over the medium until the shading transmission has ended.

FIG. 3 illustrates an embodiment of a timing and power diagram to enable the coexistence of high-density and low density transmissions for a system such as the system 100 shown in FIG. 1. The timing and power diagram illustrates the initiation of a shading transmission 350 by transmitter A and receiver B demarked by AB 310. The diagram also illustrates the joining of the shading transmission by transmitter C and receiver D demarked by CD 330. Note that time progresses from left to right and power is indicated roughly by the height of the items within a row, i.e., the rows of AB 310 and CD 330. Note also that any number of transmitters and receivers may join the shading transmission so long as they determine that they will not interfere with reception by the other receivers in the shading transmission 350, the transmitters and receivers are not blocked by another scheduled transmission, and there is time within the opportunity window to join the shading transmission 350. Note also that the heights of the handshake packets (self-CTS 312, RTS 314, CTS 316) and the data 320 are representative of the relative power levels at which they are transmitted.

Transmitter A transmits the self-CTS 312 followed shortly thereafter by an RTS 314. The self-CTS 312 and the RTS 314 may include NAV values indicative of the duration of the shading transmission that the transmitter A is initiating. Receiver B may respond to the self-CTS 312 and the RTS 314 with a CTS 316. In the present embodiment, transmitter A and receiver B may transmit the handshake packets at full power to notify nearby legacy devices that the medium is busy for the duration indicated by the NAV.

The shading transmission 350 includes an opportunity window 318 established by AB 310. The opportunity window 318 allows other low power capable devices to join the shading transmission to transmit data in parallel with AB 310 during the data period 320. AB 310 does not transmit during the opportunity window 318 as indicated by the dashed lines. The ACK 322 terminates the shading transmission 350. Note that the data period 320 includes the low power transmission.

The low power utilized by AB 310 is determined based upon the QoS required for the transmission. Note also that in other embodiments, the ACK 322 may be transmitted at a higher power level than the data transmission.

CD 330 represents the timing and power diagram of the transmissions from transmitter C to receiver D. Transmitter C may recognize the shading transmission initiated by AB 310 based upon one or more of the handshake packets. CD 330 may determine if CD 330 is blocked from using the medium by another device such as a legacy transmitter or another low power capable transmitter that is outside the range of AB 310 but within transmission range of CD 330. CD 330 may determine if it is blocked by checking the NAV and the device associated with the NAV.

CD 330 may then determine whether the joining the shading transmission 350 will interfere with the reception of the data transmission from transmitter A to receiver B during the data period 320. Note that if a subsequent transmitter and receiver joins, the subsequent transmitter would have to determine a transmission power level that would not interfere with AB 310 and that would not interfere with CD 330. If CD 330 determines a power level that both satisfies a QoS for the data transmission of CD 330 during the data period, transmitter C transmits a RTS 332 at the beginning of opportunity window 318 and receiver D responds with a CTS 334. Transmitter C then waits for the remaining duration of the opportunity window 318, which is depicted as the opportunity window 336, before transmitting data during the data period 338 and the ACK 340. Note that the data transmission of data period 338 is performed at the same time as or partially overlap with the data transmission of the data period 320, which can be seen by the relative positioning of the data periods 320 and 338 with respect to one another.

FIG. 4 depicts an embodiment of a timing and power diagram to enable the coexistence of high-density and low density transmissions. The content of FIG. 4 is the same as FIG. 3 in most respects to illustrate a different protocol for CD joining the shading transmission initiated by AB. In particular, transmitter C first issues a self-CTS 410 and then an RTS before receiver D transmits a CTS. This additional self-CTS 410 may provide notice to other receivers beyond the transmission range of transmitter A that the shading transmission can be joined. In such situations, the self-CTS 410, RTS, and/or CTS may communicate the remaining duration of the opportunity window. For example, the modulation/coding schemes (MCSs) or some bit flag of the self-CTS/RTS/CTS can be used to specify the length of the opportunity window.

Furthermore, the self-CTS 410 may include a flag or bit to indicate the shading transmission starts. In other embodiments, the self-CTS 410 may distinguish the transmission from a legacy transmission and potentially other variants of the shading transmission that are implemented in nearby devices.

Figure 5:
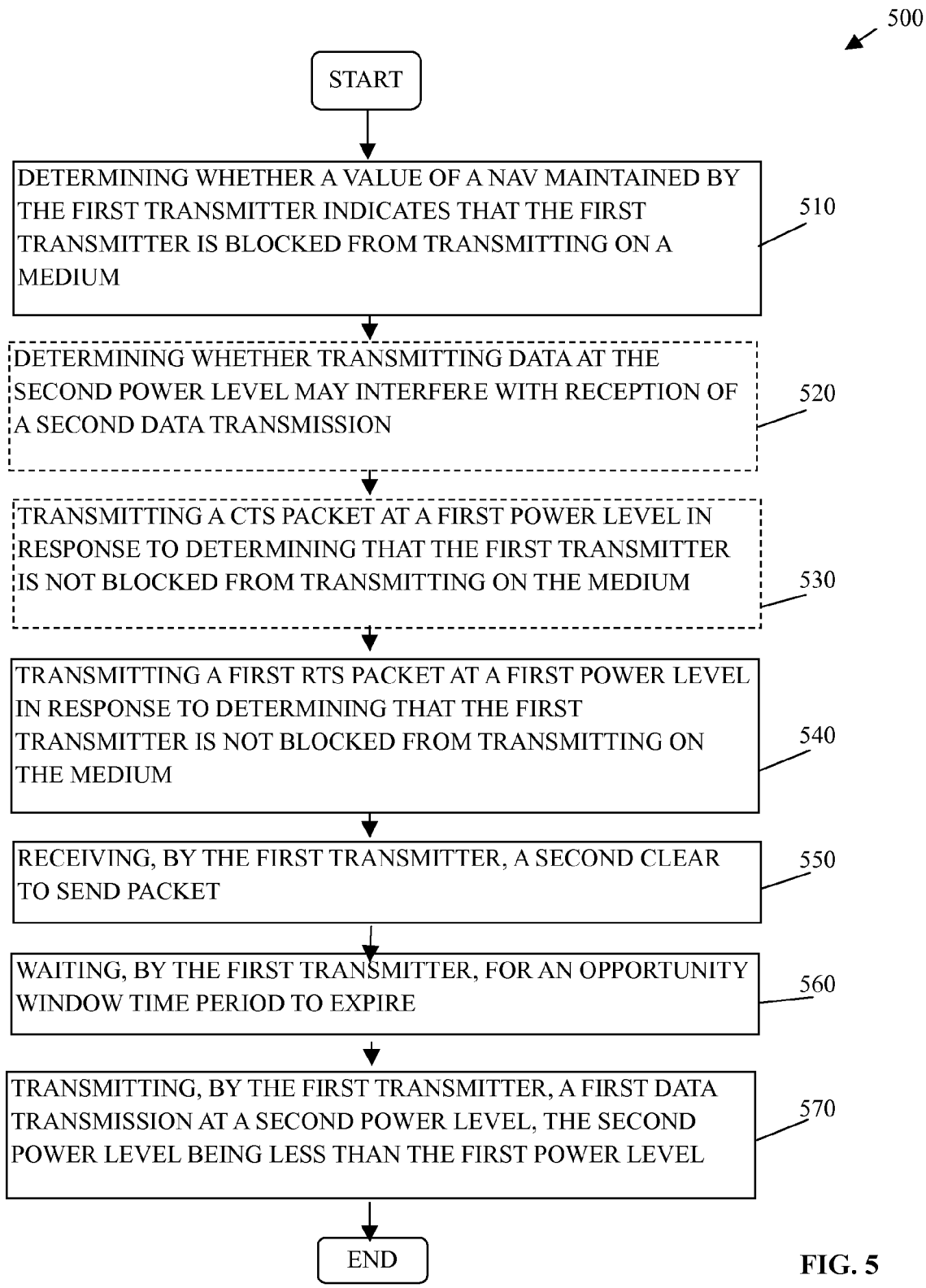
FIG. 5 illustrates a flow chart of another embodiment to initiate and join high-density transmissions.

FIG. 5 illustrates an embodiment of a flow chart 500 to enhance performance of a wireless display transmission for a system such as the system 200 illustrated in FIG. 2. The flow chart 500 begins with determining, by a first transmitter, whether a value of a network allocation vector maintained by the first transmitter indicates that the first transmitter is blocked from transmitting on a medium at element 510. If the first transmitter is blocked, the first transmitter will wait until the blocking transmission completes. If the first transmitter is not blocked, the first transmitter may be available to initiate a shading transmission or to join a shading transmission.

If the first transmitter is determining whether to join a shading transmission. The first transmitter will continue with the element 520. Otherwise, the flow chart 500 skips to element 530. The element 520 involves determining whether transmitting data at the second power level may interfere with reception of a second data transmission. In other words, before joining a shading transmission, the first transmitter should determine whether joining the transmission will cause interference more than an acceptable amount of interference with other devices that are already joined in the shading transmission. In some embodiments, determining whether transmitting data at the second power level may interfere with reception of a second data transmission involves estimating a distance between a second receiver and the first transmitter based upon a drop in power from a ready to send packet transmitted by the second receiver. In further embodiments, determining whether transmitting data at the second power level may interfere with reception of a second data transmission involves estimating a power attenuation between a second receiver and the first transmitter based upon a drop in power from a ready to send packet transmitted by the second receiver.

In several embodiments, determining whether transmitting data at the second power level may interfere with reception of a second data transmission comprises estimating a third power level that is a power level to transmit the first data transmission that avoids interfering with the second data transmission. In such embodiments, estimating a third power level that is a power level to transmit the first data transmission that avoids interfering with the second data transmission may involve estimating the third power level as the maximum power level for transmitting the first data transmission that avoids interfering with the second data transmission.

In the present embodiment, an optional element for joining a shading transmission involves transmitting, by the first transmitter, a first CTS packet at a first power level in response to determining that the first transmitter is not blocked from transmitting on the medium at element 530. The CTS may comprise a self-CTS and, in some embodiments, the self-CTS may include a flag or bit to indicate that the shading transmission starts. In many embodiments, the first power level is a full power level.

Thereafter, the first transmitter may transmit a first RTS packet at a first power level in response to determining that the first transmitter is not blocked from transmitting on the medium at element 540. And the first transmitter may receive a second clear to send packet at element 550.

Once the handshake packets have been transmitted, the first transmitter may wait for an opportunity window time period to expire at element 560. The opportunity window time period is a time period during which other low power capable devices may join the shading transmission.

The first transmitter may then transmit a first data transmission at a second power level, the second power level being less than the first power level at element 570. In many embodiments, transmitting, by the first transmitter, the first data transmission at the second power level involves transmitting the first data transmission at a fourth power level determined to provide quality of service for the first data transmission by the first transmitter. In some embodiments, transmitting the first data transmission at a fourth power level determined to provide quality of service for the first data transmission by the first transmitter involves transmitting the first data transmission at the fourth power level, wherein the fourth power level is a minimum power level that supports a quality of service for the first data transmission.

Another embodiment is implemented as a program product for implementing systems and methods described with reference to FIGS. 1-5. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Note that a tangible storage medium does not store signals but stores one or more values representative of data. A medium can be an electronic, magnetic, optical, electromagnetic, infrared, or semiconductor system (or apparatus or device) or a propagation medium. Examples of a computer-readable storage medium include tangible media such as semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates coexistence of high and low density transmissions. It is understood that the form of the embodiments shown and described in the detailed description and the drawings are to be taken merely as examples. It is intended that the following claims be interpreted broadly to embrace all variations of the example embodiments disclosed.

What is claimed is:

1. A method to enable coexistence of high-density and low-density transmissions on a medium, the method comprising:
   determining, by a first transmitter, whether a value of a network allocation vector maintained by the first transmitter indicates that the first transmitter is blocked from transmitting on a medium;
   transmitting, by the first transmitter, a first ready to send packet at a first power level in response to determining that the first transmitter is not blocked from transmitting on the medium;
   transmitting, by the first transmitter, a first clear to send packet at the first power level after transmitting the first ready to send packet;
   receiving, by the first transmitter, a second clear to send packet after transmitting the first clear to send; and
   transmitting, by the first transmitter after receiving the second clear to send, a first data transmission at a second power level, the second power level being less than the first power level, wherein the clear to send packets comprise handshake packets and the data transmission comprises a data packet.

2. The method of claim 1, further comprising waiting, by the first transmitter, for an opportunity window time period to expire.

3. The method of claim 1, further comprising determining whether transmitting data at the second power level may interfere with reception of a second data transmission.

4. The method of claim 3, wherein determining whether transmitting data at the second power level may interfere with reception of a second data transmission comprises estimating a distance between a second receiver and the first transmitter based upon a drop in power from a ready to send packet transmitted by the second receiver.

5. The method of claim 3, wherein determining whether transmitting data at the second power level may interfere with reception of a second data transmission comprises estimating a power attenuation between a second receiver and the first transmitter based upon a drop in power from a ready to send packet transmitted by the second receiver.

6. The method of claim 3, wherein determining whether transmitting data at the second power level may interfere with reception of a second data transmission comprises estimating a third power level that is a power level to transmit the first data transmission that avoids interfering with the second data transmission.

7. The method of claim 6, wherein estimating a third power level that is a power level to transmit the first data transmission that avoids interfering with the second data transmission comprises estimating the third power level as the maximum power level for transmitting the first data transmission that avoids interfering with the second data transmission.

8. The method of claim 6, wherein determining whether transmitting data at the second power level may interfere with reception of a second data transmission comprises comparing the third power level with a fourth power level, wherein the fourth power level is a power level that supports a quality of service for the first data transmission.

9. The method of claim 1, wherein transmitting, by the first transmitter, the first data transmission at the second power level comprises transmitting the first data transmission at a fourth power level determined to provide quality of service for the first data transmission by the first transmitter.

10. The method of claim 1, wherein transmitting the first data transmission at a fourth power level determined to provide quality of service for the first data transmission by the first transmitter comprises transmitting the first data transmission at the fourth power level, wherein the fourth power level is a minimum power level that supports a quality of service for the first data transmission.

11. An apparatus to enable coexistence of high-density and low-density transmissions on a medium, the apparatus comprising:
    a transmitter to transmit on the medium comprising a transmit power control to adjust a transmission power to power levels;
    a memory comprising a buffer for storing a network allocation value and a buffer for storing a device associated with the network allocation value; and
    logic to determine whether a value of a network allocation vector indicates that the apparatus is blocked from transmitting on the medium; to transmit a first ready to send packet at a first power level in response to determining that the apparatus is not blocked from transmitting on the medium; to transmit a first clear to send packet at the first power level after transmitting the first ready to send packet; to receive a second clear to send packet after transmission of the first clear to send packet; and to transmit, after reception of the second clear to send packet, a first data transmission at a second power level, the second power level being less than the first power level, wherein the clear to send packets comprise handshake packets and the data transmission comprises a data packet.

12. The apparatus of claim 11, wherein the logic further comprises logic to wait for an opportunity window time period to expire.

13. The apparatus of claim 11, wherein the logic further comprises logic to determine whether transmitting data at the second power level may interfere with reception of a second data transmission.

14. The apparatus of claim 11, wherein the logic to determine whether transmitting data at the second power level may interfere with reception of a second data transmission comprises logic to estimate a distance between a second receiver and the first transmitter based upon a drop in power from a ready to send packet transmitted by the second receiver.

15. A non-transitory computer readable storage medium having a computer useable program code embodied therewith, the computer useable program code, when executed on a computer, configured to perform operations, the operations comprising:
    determining, by a first transmitter, whether a value of a network allocation vector maintained by the first transmitter indicates that the first transmitter is blocked from transmitting on a medium;

transmitting, by the first transmitter, a first ready to send packet at a first power level in response to determining that the first transmitter is not blocked from transmitting on the medium;

transmitting, by the first transmitter, a first clear to send packet at the first power level after transmitting the first ready to send packet;

receiving, by the first transmitter, a second clear to send packet after transmitting the first clear to send packet; and transmitting, by the first transmitter after receiving the second clear to send packet, a first data transmission at a second power level, the second power level being less than the first power level, wherein the clear to send packets comprise handshake packets and the data transmission comprises a data packet.

16. The non-transitory computer readable storage medium of claim 15, wherein the operations further comprise determining whether transmitting data at the second power level may interfere with reception of a second data transmission.

17. The non-transitory computer readable storage medium of claim 15, herein the operations further comprise waiting, by the first transmitter, for an opportunity window time period to expire.

* * * * *